United States Patent
Shao (10) Patent No.: US 10,750,356 B2
(45) Date of Patent: Aug. 18, 2020

(54) CONFIGURATION MANAGEMENT METHOD, APPARATUS, AND SYSTEM FOR TERMINAL IN INTERNET OF THINGS

(71) Applicant: ZTE CORPORATION, Shenzhen, Guangdong Province (CN)

(72) Inventor: Weixiang Shao, Shenzhen (CN)

(73) Assignee: ZTE CORPORATION (CN)

( * ) Notice: Subject to any disclaimer, the term of this patent is extended or adjusted under 35 U.S.C. 154(b) by 161 days.

(21) Appl. No.: 15/326,040

(22) PCT Filed: Mar. 16, 2015

(86) PCT No.: PCT/CN2015/074328
§ 371 (c)(1),
(2) Date: Jan. 13, 2017

(87) PCT Pub. No.: WO2015/184881
PCT Pub. Date: Dec. 10, 2015

(65) Prior Publication Data
US 2017/0208457 A1 Jul. 20, 2017

(30) Foreign Application Priority Data
Jul. 18, 2014 (CN) .......................... 2014 1 0345945

(51) Int. Cl.
*H04W 8/24* (2009.01)
*H04L 12/24* (2006.01)
(Continued)

(52) U.S. Cl.
CPC ............... *H04W 8/24* (2013.01); *H04L 41/08* (2013.01); *H04L 41/0853* (2013.01); *H04W 8/02* (2013.01); *H04W 8/10* (2013.01)

(58) Field of Classification Search
CPC ... H04W 8/24; H04W 8/02; H04W 8/10; H04L 41/08; H04L 41/0863
See application file for complete search history.

(56) References Cited

U.S. PATENT DOCUMENTS

2006/0073788 A1* 4/2006 Halkka ............. H04M 1/72572
455/41.2
2010/0128679 A1* 5/2010 Kwon ................. H04L 12/2838
370/329
(Continued)

FOREIGN PATENT DOCUMENTS

CN 102378177 A 3/2013
CN 103841557 A 6/2014
(Continued)

OTHER PUBLICATIONS oneM2M Functional Architecture. oneM2M Partners Type 1. 2013. Document No. oneM2M-TS-0001-V-0.3.2.
(Continued)

*Primary Examiner* — Christopher M Crutchfield
*Assistant Examiner* — Tito Q Pham
(74) *Attorney, Agent, or Firm* — McDonald Hopkins LLC (57) ABSTRACT

The present document discloses a method, apparatus and system for a terminal configuration service of the Internet of Things, the method includes: receiving a management operation or capability of a terminal configuration service requested by an application entity, managing a requested target terminal according to the management operation or capability of the terminal configuration service, and providing an operation result and/or an operation state to the application entity, which achieves unified management of the terminal configuration services.

16 Claims, 4 Drawing Sheets

(51) Int. Cl.
*H04W 8/02* (2009.01)
*H04W 8/10* (2009.01)

(56) References Cited

U.S. PATENT DOCUMENTS

| | | | | |
|---|---|---|---|---|
| 2012/0207041 | A1* | 8/2012 | Piernot | H04L 43/18 370/252 |
| 2013/0159410 | A1* | 6/2013 | Lee | H04L 12/184 709/204 |
| 2014/0074932 | A1* | 3/2014 | Mihara | H04L 67/06 709/204 |
| 2017/0048336 | A1* | 2/2017 | Novo Diaz | H04L 67/16 |

FOREIGN PATENT DOCUMENTS

| | | |
|---|---|---|
| EP | 2530958 A1 | 12/2012 |
| WO | WO2013150466 A2 | 10/2013 |

OTHER PUBLICATIONS oneM2M Functional Architecture. oneM2M Partners Type 1. 2014. Document No. oneM2M-TS-0001-V-0.3.2.

Functional Architecture Spec TS-0001 v0.3.2. oneM2M Partners Type 1. 2014.

\* cited by examiner

CONFIGURATION MANAGEMENT METHOD, APPARATUS, AND SYSTEM FOR TERMINAL IN INTERNET OF THINGS

TECHNICAL FIELD

The present document relates to the field of communications, and in particular, to a method, apparatus and system for a terminal configuration service of the Internet of Things.

BACKGROUND OF THE RELATED ART

The Internet of things is an important component of the new generation of information technology, and its English name is "The Internet of things". As the name implies, the Internet of things is the Internet in which things are connected together. The International Telecommunication Union (ITU) Internet Report, published by the ITU, defines the Internet of Things as a network which connects any things to the Internet through information sensing devices such as a quick response code identification device, a Radio Frequency Identification (RFID) apparatus, an infrared sensor, a global positioning system and a laser scanner etc. according to an agreed protocol, to perform information exchange and communication, so as to achieve intelligent identification, positioning, tracking, monitoring and management.

An M2M concept is often introduced in the Internet of things, and can be interpreted as Man to Man, Man to Machine and Machine to Machine. In essence, in the man to machine interaction and machine to machine interaction, it mostly aims at achieving man to man information interaction. M2M networks are the main presentation form of the Internet of Things at this stage, and the M2M networks include machine to machine communication networks, man to machine communication networks and machines to man communication networks. Devices in the M2M networks primarily include M2M terminals, M2M gateways, and M2M servers.

Figure 1:
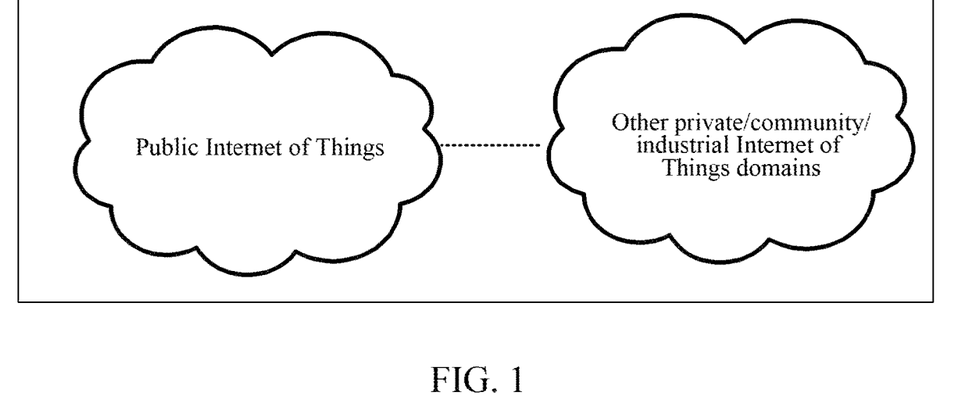
FIG. 1 is a diagram of an Internet of Things system according to the existing technology.

FIG. 1 is a diagram of the Internet of Things system according to the existing technology. As shown in FIG. 1, the Internet of Things may be classified as a private Internet of Things (which is generally orientated to provide services in a single organization), a public Internet of Things (which provides services to the public or a large user group based on the Internet), a community Internet of Things (which provides services to an associated "community" or organization group) etc. At the same time, at this stage, the Internet of Things has a large number of applications in different industries, including smart agriculture, smart grids, intelligent transportation, intelligent logistics, intelligent medical health, intelligent home etc. In particular, these industries all deploy their own professional Internet of Things respectively, including corresponding professional Internet of Things/M2M devices for example platform devices such as terminals, gateways and servers etc.

As providers of public communication services, telecommunication operators also play a role as service providers of public Internet of Things when they provide Internet of Things/M2M services. For terminals of the private Internet of Things, the community Internet of Things and the professional Internet of Things in various industries, at this stage, as the service providers of the public Internet of Things, the telecommunication operators are lack of effective technical means to implement unified management of terminals and achieve services.

SUMMARY

With respect to the problem that as the service providers of the public Internet of Things, the telecommunication operators cannot achieve unified management of terminals in the public Internet of Things and other Internet of Things domains, the present document provides a method, apparatus and system for a terminal configuration service of the Internet of Things to at least solve the above problem.

According to an aspect of the present document, there is provided a method for a terminal configuration service of the Internet of Things, including: receiving a management operation or capability of a terminal configuration service requested by an application entity, and managing a requested target terminal according to the management operation or capability of the terminal configuration service; and providing an operation result and/or an operation state to the application entity.

Alternatively, the target terminal includes one of the following: a single terminal, a plurality of terminals indicated by a list, and a group of terminals.

Alternatively, the management operation or capability of the terminal configuration service is performed based on a scheduling arrangement.

Alternatively, a message exchange mode used by the management operation or capability of the terminal configuration service includes at least one of the following: a request response mode of receiving a request and synchronously transmitting a response; and a request asynchronous notification mode of reporting to the application entity after the operation is completed.

Alternatively, the management operation or capability of the terminal configuration service includes: acquiring terminal information; herein input information for the acquiring terminal information includes: a terminal identifier; return information for the acquiring terminal information includes at least one of the following: a response type, terminal information, a memory, a battery, and a lock state; the terminal information includes at least one of the following: a terminal label, a manufacturer, a terminal model, a terminal type, a firmware version, a software version, and a hardware version; the memory includes at least one of the following: a currently available memory, and a total memory; and the battery includes at least one of the following: a current battery level, and a battery state.

Alternatively, the management operation or capability of the terminal configuration service includes: acquiring a terminal capability; herein input information for the acquiring a terminal capacity includes: a terminal identifier; return information for the acquiring a terminal capability includes at least one of the following: a response type, and a terminal capability list; the terminal capability list includes one or more terminal capabilities; and the terminal capability includes at least one of the following: a capability name, an attachment flag, a capability action state, an enabling flag, and a disabling flag.

Alternatively, the management operation or capability of the terminal configuration service includes: enabling a terminal capability; herein input information for the enabling a terminal capability includes at least one of the following: a terminal identifier, a capability name, and an enabling flag; and return information for the enabling a terminal capability includes a response type.

Alternatively, the management operation or capability of the terminal configuration service includes: disabling a terminal capability; herein input information for the disabling a terminal capability includes at least one of the following: a terminal identifier, a capability name, and a disabling flag; and return information for the disabling a terminal capability includes a response type.

Alternatively, the management operation or capability of the terminal configuration service includes: configuring a terminal parameter; herein input information for the configuring a terminal parameter includes at least one of the following: a terminal identifier, and a configuration parameter list, the configuration parameter list includes one or more configuration parameters, and the configuration parameter includes at least one of the following: a parameter name, and a parameter value; and return information for the configuring a terminal parameter includes a response type.

Alternatively, the management operation or capability of the terminal configuration service includes: providing a terminal configuration; herein input information for the providing a terminal configuration includes at least one of the following: a choreography rule list, a report policy, and an aggregation policy; and return information for the providing a terminal configuration includes a response type.

Alternatively, the choreography rule list includes one or more choreography rules, the choreography rule includes at least one of the following: a group identifier, a terminal identifier, a management operation, and scheduling information; and the management operation includes at least one of the following: acquiring terminal information, acquiring a terminal capability, enabling a terminal capability, disabling a terminal capability, and configuring a terminal parameter.

Alternatively, the management operation or capability of the terminal configuration service includes: reporting a terminal configuration; herein input information for the reporting a terminal configuration includes at least one of the following: a final report flag, a serial number, a configuration report list, and an aggregation policy; and return information for the reporting a terminal configuration includes a response type.

Alternatively, the configuration report list includes one or more configuration reports including at least one of the following: a group identifier, a terminal identifier, a management operation, and an operation result; and the management operation includes at least one of the following: acquiring terminal information, acquiring a terminal capability, enabling a terminal capability, disabling a terminal capability, and configuring a terminal parameter.

Alternatively, receiving a management operation or capability of a terminal configuration service requested by an application entity includes: adapting the management operation or capability of the terminal configuration service to a corresponding technical operation of a terminal management server.

Alternatively, the terminal management server includes a terminal management server located in an underlying network of a public Internet of Things domain or a terminal management server in another service provider domain.

Alternatively, the terminal management server utilizes at least one of the following technologies: an Extensible Messaging and Presence Protocol (XMPP), a Message Queuing Telemetry Transport (MQTT), an Open Mobile Alliance Device Management (OMA DM), a Broadband Forum Client WAN Management Protocol (BBF CWMP), an Open Mobile Alliance Lightweight Machine to Machine Protocol (OMA LightweightM2M).

According to another aspect of the present document, there is provided an apparatus for a terminal configuration service of the Internet of Things, including: a management module arranged to receive a management operation or capability of a terminal configuration service requested by an application entity, and manage a requested target terminal according to the management operation or capability of the terminal configuration service; and a feedback module arranged to provide an operation result and/or an operation state to the application entity.

Alternatively, the target terminal includes one of the following: a single terminal, a plurality of terminals indicated by a list, and a group of terminals.

Alternatively, the management operation or capability of the terminal configuration service is performed based on a scheduling arrangement.

Alternatively, the management module is arranged to adapt the management operation or capability of the terminal configuration service to a corresponding technical operation of a terminal management server.

Alternatively, the terminal management server includes a terminal management server located in an underlying network of a public Internet of Things domain or a terminal management server in another service provider domain.

According to a further aspect of the present document, there is provided a system for a terminal configuration service of the Internet of Things, including: an application entity arranged to request for a terminal configuration service; and a general service entity arranged to receive a management operation or capability of a terminal configuration service requested by the application entity, and manage a requested target terminal according to the management operation or capability of the terminal configuration service; and provide an operation result and/or an operation state to the application entity.

Alternatively, the system further including: a management adaptor arranged to adapt the management operation or capability of the terminal configuration service to a corresponding technical operation of a terminal management server.

With the present document, a management operation or capability of a terminal configuration service requested by an application entity is received, a requested target terminal is managed according to the management operation or capability of the terminal configuration service, and an operation result and/or an operation state is provided to the application entity, which achieves the management of the terminal configuration service.

BRIEF DESCRIPTION OF DRAWINGS

The accompanying drawings described herein are used to provide a further understanding of the present document and constitute a part of the present application, and the illustrative embodiments of the present document and the description thereof are used to explain the present document, and do not constitute an improper definition of the present document. In the accompanying drawings.

SPECIFIC EMBODIMENTS

Hereinafter, the present document will be described in detail with reference to accompanying drawings in combination with embodiments. It should be illustrated that, embodiments in the present application and features in the embodiments can be combined with each other without conflict.

The general service entity and the application entity in the following embodiments can be known with reference to the inventive patent application No. 201410127388.1, entitled "Method, apparatus and system for a M2M application service", and will not be repeated here.

In the following embodiments, the M2M terminal may be a mobile terminal (for example, a mobile phone, a tablet computer etc.), or other types of terminals, as long as it can access the Internet of Things. The operating system running on the terminal may also be various types of systems, for example, the Android system which is currently widely used, or the Windows operating system, the iOS system etc., but the present document is not limited thereto. The device may be a server, various types of gateway, or another type of device.

The terminal or device may includes a storage medium, program units stored in the storage medium may be used to perform the method described in the following embodiments. The terminal or device may further include a processor operable to execute the program units described above. It can be contemplated that the method or apparatus described below may be implemented by computer program units.

In the following embodiments, other Internet of Things domains described below may be a private Internet of Things which is orientated to provide services in a single organization, other public Internet of Things, community Internet of things etc. At the same time, it may also have a large number of applications in different industries, including smart agriculture, smart grids, intelligent transportation, intelligent logistics, intelligent medical health, intelligent home etc.

Figure 2:
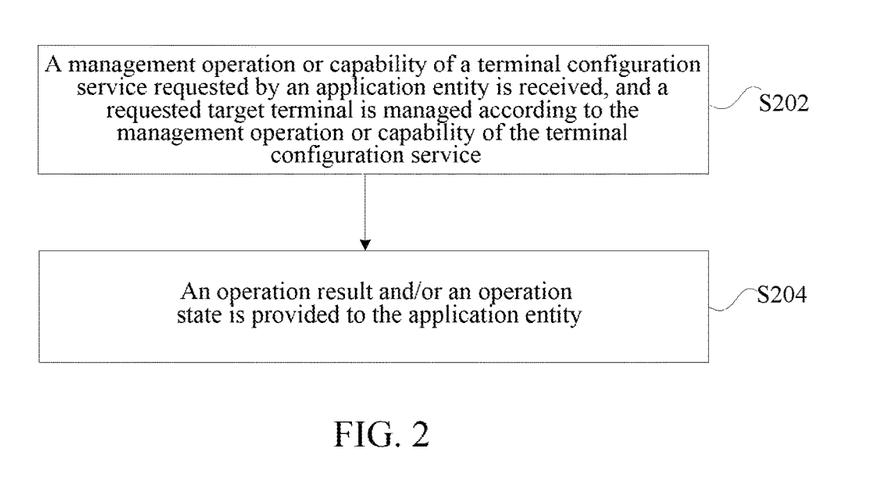
FIG. 2 is a flowchart of a method for a terminal configuration service of the Internet of Things according to an embodiment of the present document.

FIG. 2 is a flowchart of a method for a terminal configuration service of the Internet of Things according to an embodiment of the present document. As shown in FIG. 2, the method includes steps S202 to S204.

In step S202, a management operation or capability of a terminal configuration service requested by an application entity is received, and a requested target terminal is managed according to the management operation or capability of the terminal configuration service.

In step S204, an operation result and/or an operation state is provided to the application entity.

With the embodiments of the present document, a management operation or capability of a terminal configuration service requested by an application entity is received, a requested target terminal is managed according to the management operation or capability of the terminal configuration service, and an operation result and/or an operation state is provided to the application entity, which achieves management of the terminal configuration services.

Alternatively, the target terminal may include one of the following: a single terminal, a plurality of terminals indicated by a list, and a group of terminals.

In an implementation of the embodiment of the present document, alternatively, the management operation or capability of the terminal configuration service may be performed based on a scheduling arrangement.

In an implementation of the embodiment of the present document, alternatively, a message exchange mode used by the management operation or capability of the terminal configuration service includes at least one of the following: a request response mode of receiving a request and synchronously transmitting a response; and a request asynchronous notification mode of reporting to the application entity after the operation is completed.

In an implementation of the embodiment of the present document, alternatively, the management operation or capability of the terminal configuration service includes: acquiring terminal information; herein input information for the acquiring terminal information includes: a terminal identifier; return information for the acquiring terminal information includes at least one of a response type, terminal information, a memory, a battery, and a lock state; the terminal information includes at least one of the following: a terminal label, a manufacturer, a terminal model, a terminal type, a firmware version, a software version, and a hardware version; the memory includes at least one of the following: a currently available memory, and a total memory; and the battery includes at least one of the following: a current battery level, and a battery state.

In an implementation of the embodiment of the present document, alternatively, the management operation or capability of the terminal configuration service includes: acquiring a terminal capability; herein input information for the acquiring a terminal capacity includes: a terminal identifier; return information for the acquiring a terminal capability includes at least one of the following: a response type, and a terminal capability list; the terminal capability list includes one or more terminal capabilities; and the terminal capability includes at least one of the following: a capability name, an attachment flag, a capability action state, an enabling flag, and a disabling flag.

In an implementation of the embodiment of the present document, alternatively, the management operation or capability of the terminal configuration service includes: enabling a terminal capability; herein input information for the enabling a terminal capability includes at least one of the following: a terminal identifier, a capability name, and an enabling flag; and return information for the enabling a terminal capability includes a response type.

In an implementation of the embodiment of the present document, alternatively, the management operation or capability of the terminal configuration service includes: disabling a terminal capability; herein input information for the disabling a terminal capability includes at least one of the following: a terminal identifier, a capability name, and a disabling flag; and return information for the disabling a terminal capability includes a response type.

In an implementation of the embodiment of the present document, alternatively, the management operation or capability of the terminal configuration service includes: configuring a terminal parameter; herein input information for the configuring a terminal parameter includes at least one of the following: a terminal identifier, and a configuration parameter list which includes one or more configuration parameters, the configuration parameter includes at least one of the following: a parameter name, and a parameter value; and return information for the configuring a terminal parameter includes a response type.

In an implementation of the embodiment of the present document, alternatively, the management operation or capability of the terminal configuration service includes: providing a terminal configuration; herein input information for the providing a terminal configuration includes at least one of the following: a choreography rule list, a report policy, and an aggregation policy; and return information for the providing a terminal configuration includes a response type.

In an implementation of the embodiment of the present document, alternatively, the choreography rule list includes one or more choreography rules including at least one of the following: a group identifier, a terminal identifier, a management operation, and scheduling information; and the management operation includes at least one of the following: acquiring terminal information, acquiring a terminal capability, enabling a terminal capability, disabling a terminal capability, and configuring a terminal parameter.

In an implementation of the embodiment of the present document, alternatively, the management operation or capability of the terminal configuration service includes: reporting a terminal configuration; herein input information for the reporting a terminal configuration includes at least one of the following: a final report flag, a serial number, a configuration report list, and an aggregation policy; and return information for the reporting a terminal configuration includes a response type.

In an implementation of the embodiment of the present document, alternatively, the configuration report list includes one or more configuration reports including at least one of the following: a group identifier, a terminal identifier, a management operation, and an operation result; and the management operation includes at least one of the following: acquiring terminal information, acquiring a terminal capability, enabling a terminal capability, disabling a terminal capability, and configuring a terminal parameter.

In an implementation of the embodiment of the present document, alternatively, responding a management operation or capability of a terminal configuration service requested by an application entity includes: adapting the management operation or capability of the terminal configuration service to a corresponding technical operation of a terminal management server.

In an implementation of the embodiment of the present document, alternatively, the terminal management server includes a terminal management server located in an underlying network of a public Internet of Things domain or a terminal management server in another service provider domain.

Alternatively, the terminal management server utilizes at least one of the following technologies: an Extensible Messaging and Presence Protocol (XMPP), a Message Queuing Telemetry Transport (MQTT), an Open Mobile Alliance Device Management (OMA DM), a Broadband Forum Client WAN Management Protocol (BBF CWMP), an Open Mobile Alliance Lightweight Machine to Machine Protocol (OMA LightweightM2M).

Figure 3:
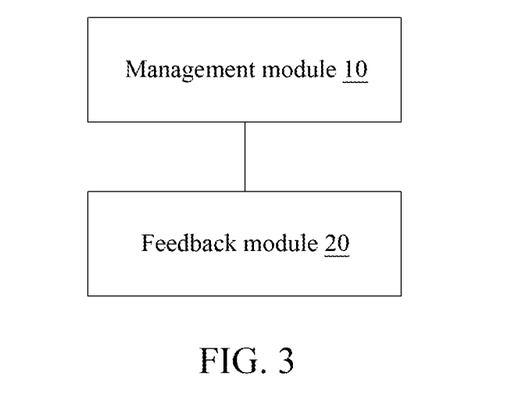
FIG. 3 is a structural block diagram of an apparatus for a terminal configuration service of the Internet of Things according to an embodiment of the present document.

FIG. 3 is a structural block diagram of an apparatus for a terminal configuration service of the Internet of Things according to an embodiment of the present document. As shown in FIG. 3, the apparatus includes: a management module 10 arranged to receive a management operation or capability of a terminal configuration service requested by an application entity, and manage a requested target terminal according to the management operation or capability of the terminal configuration service; and a feedback module 20 arranged to provide an operation result and/or an operation state to the application entity.

Alternatively, the target terminal includes one of the following: a single terminal, a plurality of terminals indicated by a list, and a group of terminals.

In an implementation of the embodiment of the present document, the management operation or capability of the terminal configuration service may be performed based on a scheduling arrangement.

Alternatively, the management module 10 is arranged to adapt the management operation or capability of the terminal configuration service to a corresponding technical operation of a terminal management server.

Alternatively, the terminal management server includes a terminal management server located in an underlying network of a public Internet of Things domain or a terminal management server in another service provider domain.

It should be illustrated that, portions in the above-described apparatus corresponding to the above-described method can be known with reference to the description of the above-described method, and will not be repeated here.

Figure 4:
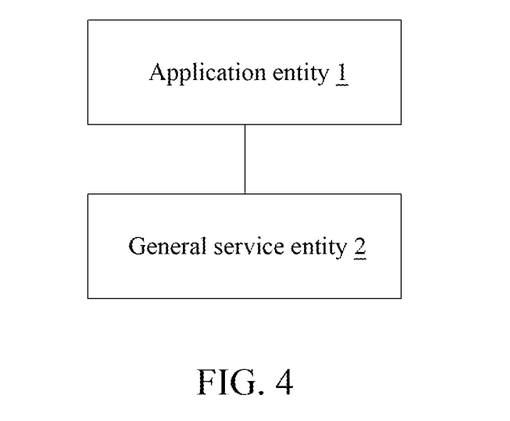
FIG. 4 is a diagram of a system for a terminal configuration service of the Internet of Things according to an embodiment of the present document.

FIG. 4 is a diagram of a system for a terminal configuration service of the Internet of Things according to an embodiment of the present document. As shown in FIG. 4, the system includes: an application entity 1 arranged to request for a terminal configuration service; and a general service entity 2 arranged to receive a management operation or capability of a terminal configuration service requested by the application entity, and manage a requested target terminal according to the management operation or capability of the terminal configuration service; and provide an operation result and/or an operation state to the application entity.

Alternatively, the system further includes: a management adaptor arranged to adapt the management operation or capability of the terminal configuration service to a corresponding technical operation of a terminal management server.

It should be illustrated that, portions in the above-described system corresponding to the above-described method can be known with reference to the description of the above-described method, and will not be repeated here.

The optional implementation will be described below in detail with reference to an example. It can be expected that the optional implementation is not limited to the method described below. A specific structure of the general service entity in the following optional implementation can be known with reference to the inventive patent application No. 201410127388.1, entitled "Method, apparatus and system for an M2M application service", and will not be repeated here.

Figure 5:
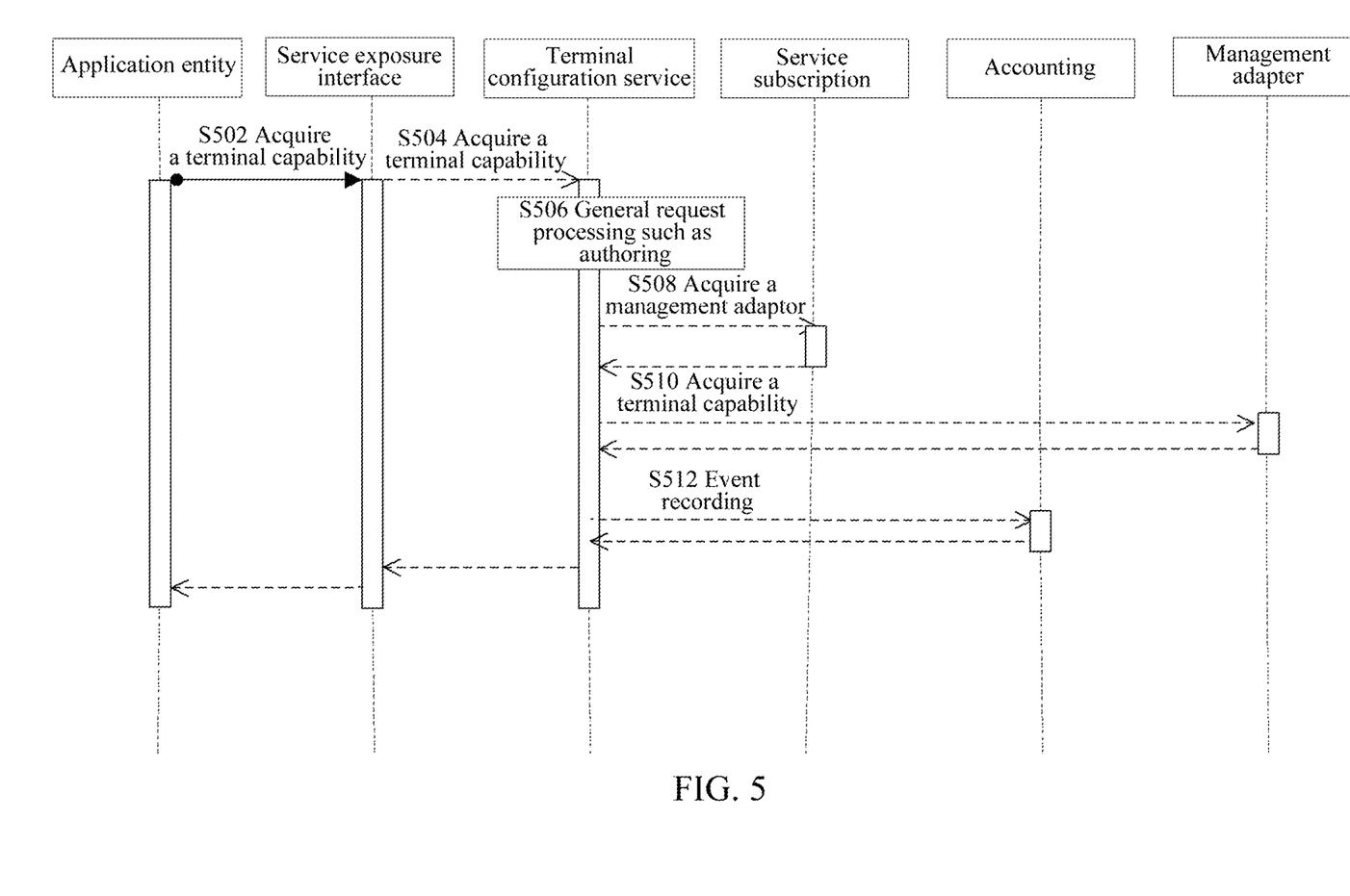
FIG. 5 is a flowchart of an alternative method one of a terminal configuration service of the Internet of Things according to an embodiment of the present document.

FIG. 5 is a flowchart of an alternative method one for a terminal configuration service of the Internet of Things according to an embodiment of the present document, which as shown in FIG. 5, includes steps S502 to S512.

In step S502, an application entity transmits a terminal capability acquisition request to a service exposure interface of the terminal configuration service.

In step S504, the service exposure interface forwards the terminal capability acquisition request to the terminal configuration service.

In step S506, the terminal configuration service invokes general request processing such as authorizing.

In step S508, the terminal configuration service acquires a management adapter through a service subscription relationship.

In step S510, the terminal configuration service transmits the terminal capability acquisition request to the management adapter. The management adapter then invokes a terminal management server located in an underlying network of a public Internet of Things domain or a terminal management server of another service provider domain. The terminal management server may use at least one of the following technologies: an Extensible Messaging and Presence Protocol (XMPP), a Message Queuing Telemetry Transport (MQTT), an Open Mobile Alliance Device Management (OMA DM), a Broadband Forum Client WAN Management Protocol (BBF CWMP), an Open Mobile Alliance Lightweight Machine to Machine Protocol (OMA LightweightM2M).

In step S512, the terminal configuration service performs event recording.

Figure 6:
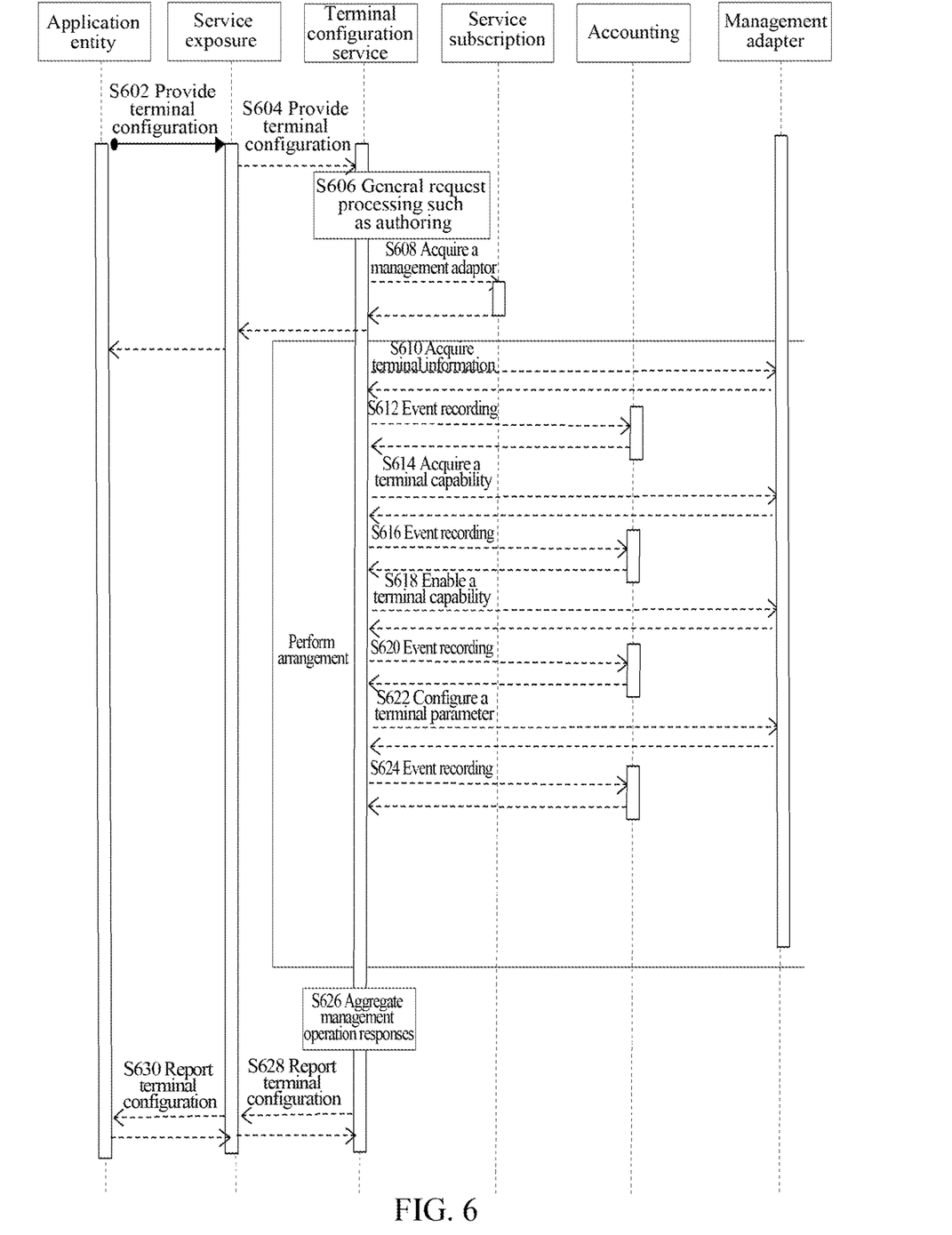
FIG. 6 is a flowchart of an alternative method two of a terminal configuration service of the Internet of Things according to an embodiment of the present document.

FIG. 6 is a flowchart of an alternative method two for a terminal configuration service of the Internet of Things according to an embodiment of the present document, which as shown in FIG. 6, includes steps S602 to S638.

In step S602, an application entity transmits a terminal configuration provision request to a service exposure interface of the terminal configuration service, herein the request is a composite management operation.

In step S604, the service exposure interface forwards the terminal configuration provision request to the terminal configuration service.

In step S606, the terminal configuration service invokes general request processing such as authorizing.

In step S608, the terminal configuration service acquires a management adapter through a service subscription relationship.

In step S610, the terminal configuration service transmits a terminal information acquisition request to the management adapter.

In step S612, the terminal configuration service performs event recording.

In step S614, the terminal configuration service transmits a terminal capability acquisition request to the management adapter.

In step S616, the terminal configuration service performs event recording.

In step S618, the terminal configuration service transmits a terminal capability enabling request to the management adapter.

In step S620, the terminal configuration service performs event recording.

In step S622, the terminal configuration service transmits a terminal parameter configuration request to the management adapter.

In step S624, the terminal configuration service performs event recording.

In step S626, the terminal configuration service aggregates management operation responses.

In step S628, the terminal configuration service transmits and reports terminal configuration to the service exposure interface.

In step S630, the service exposure interface transmits and reports the terminal configuration to the application entity.

It can be seen from the above description that the present document realizes the following technical effects: the problem of unified management of M2M terminals in the public Internet of Things and other Internet of Things is solved, and unified configuration services of the M2M terminals in the public Internet of Things and other Internet of Things are achieved.

Obviously, those skilled in the art should understand that each module or each step of the aforementioned present document can be implemented with general computing devices, and can be integrated in a single computing device, or distributed onto a network consisting of a plurality of computing devices; alternatively, they can be implemented with program codes executable by the computing devices, and therefore, they can be stored in storage devices to be executed by the computing devices; and in some cases, the steps illustrated or described can be performed in an order different from that described here; alternatively, they are respectively made into a plurality of integrated circuit modules; and alternatively, it is implemented with making several modules or steps of them into a single integrated circuit module. Thus, the present document is not limited to any specific combinations of hardware and software.

The above description is only the alternative embodiments of the present document, and is not used to limit the present document. For those skilled in the art, the present document can have a variety of modifications and changes. Any change, equivalent replacement and improvement etc. made within the essence and the principle of the present document should be contained within the protection scope of the present document.

INDUSTRIAL APPLICABILITY

As described above, with the above embodiments and alternative implementations, by receiving a management operation or capability of a terminal configuration service requested by an application entity, a requested target terminal is managed according to the management operation or capability of the terminal configuration service, and an operation result and/or an operation state is provided to the application entity, which achieves management of the terminal configuration services.

What is claimed is:
1. A method for a terminal configuration service of the Internet of Things, comprising:
 receiving a management operation or capability of a terminal configuration service requested by an application entity, and managing a requested target terminal according to the management operation or capability of the terminal configuration service; and
 providing a management result and/or a management state of the target terminal to the application entity;
 wherein receiving a management operation or capability of a terminal configuration service requested by an application entity comprises:
 adapting the management operation or capability of the terminal configuration service to a corresponding technical operation of a terminal management server, and the terminal management server comprises a terminal management server located in an underlying network of a public Internet of Things domain or a terminal management server in another service provider domain;
 wherein the management operation or capability of the terminal configuration service comprises: acquiring terminal information; wherein
 input information for said acquiring terminal information comprises: a terminal identifier;
 return information for said acquiring terminal information comprises terminal information, and at least one of the following: a memory, a battery, and a lock state;

the terminal information comprises at least one of the following: a manufacturer, a terminal model, a terminal type, a firmware version, a software version, and a hardware version;

the memory comprises at least one of the following: a currently available memory, and a total memory; and the battery comprises at least one of the following: a current battery level, and a battery state;

wherein the management operation or capability of the terminal configuration service further comprises: acquiring a terminal capability; wherein input information for said acquiring a terminal capacity comprises: a terminal identifier;

return information for said acquiring a terminal capability comprises at least one of the following: a response type, and a terminal capability list;

the terminal capability list comprises one or more terminal capabilities; and the terminal capability comprises at least one of the following: an attachment flag, a capability action state, an enabling flag, and a disabling flag;

wherein the terminal management server uses at least one of the following technologies: an Extensible Messaging and Presence Protocol XMPP, a Message Queuing Telemetry Transport MQTT, an Open Mobile Alliance Device Management OMA DM, a Broadband Forum Client WAN Management Protocol BBF CWMP.

2. The method according to claim 1, wherein the target terminal comprises one of the following: a single terminal, a plurality of terminals indicated by a list, and a group of terminals.

3. The method according to claim 1, wherein the management operation or capability of the terminal configuration service is performed based on a scheduling arrangement.

4. The method according to claim 1, wherein a message exchange mode used by the management operation or capability of the terminal configuration service comprises at least one of the following:

a request response mode of receiving a request and synchronously transmitting a response; and a request asynchronous notification mode of reporting to the application entity after the operation is completed.

5. The method according to claim 1, wherein the management operation or capability of the terminal configuration service comprises: enabling a terminal capability, wherein:

input information for said enabling a terminal capability comprises at least one of the following: a terminal identifier, a capability name, and an enabling flag; and return information for said enabling a terminal capability comprises a response type.

6. The method according to claim 1, wherein the management operation or capability of the terminal configuration service comprises: disabling a terminal capability, wherein:

input information for said disabling a terminal capability comprises at least one of the following: a terminal identifier, a capability name, and a disabling flag; and return information for said disabling a terminal capability comprises a response type.

7. The method according to claim 1, wherein the management operation or capability of the terminal configuration service comprises: configuring a terminal parameter, wherein:

input information for said configuring a terminal parameter comprises at least one of the following: a terminal identifier, and a configuration parameter list, wherein the configuration parameter list comprises one or more configuration parameters, and the configuration parameter comprises at least one of the following: a parameter name, and a parameter value; and return information for said configuring a terminal parameter comprises a response type.

8. The method according to claim 1, wherein the management operation or capability of the terminal configuration service comprises: providing a terminal configuration, wherein:

input information for said providing a terminal configuration comprises at least one of the following: a choreography rule list, a report policy, and an aggregation policy; and return information for said providing a terminal configuration comprises a response type.

9. The method according to claim 8, wherein the choreography rule list comprises one or more choreography rules, the choreography rule comprises at least one of the following: a group identifier, a terminal identifier, a management operation, and scheduling information, and wherein the management operation comprises at least one of the following: acquiring terminal information, acquiring a terminal capability, enabling a terminal capability, disabling a terminal capability, and configuring a terminal parameter.

10. The method according to claim 1, wherein the management operation or capability of the terminal configuration service comprises: reporting a terminal configuration, wherein:

input information for said reporting a terminal configuration comprises at least one of the following: a final report flag, a serial number, a configuration report list, and an aggregation policy; and return information for said reporting a terminal configuration comprises a response type.

11. The method according to claim 10, wherein the configuration report list comprises one or more configuration reports, and the configuration report comprises at least one of the following: a group identifier, a terminal identifier, a management operation, and an operation result, and wherein the management operation comprises at least one of the following: acquiring terminal information, acquiring a terminal capability, enabling a terminal capability, disabling a terminal capability, and configuring a terminal parameter.

12. An apparatus for configuration management for a terminal in the Internet of Things, comprising a memory storing instructions and a first processor, which, when runs the instructions in the memory, is arranged to:

receive a management operation or capability of a terminal configuration service requested by an application entity, and manage a requested target terminal according to the management operation or capability of the terminal configuration service; and provide a management result and/or a management state of the target terminal to the application entity;

wherein the processor is arranged to adapt the management operation or capability of the terminal configuration service to a corresponding technical operation of a terminal management server, and the terminal management server comprises a terminal management server located in an underlying network of a public Internet of Things domain or a terminal management server in another service provider domain;
wherein the management operation or capability of the terminal configuration service comprises: acquiring terminal information; wherein
input information for said acquiring terminal information comprises: a terminal identifier;
return information for said acquiring terminal information comprises terminal information, and at least one of the following: a memory, a battery, and a lock state;
the terminal information comprises at least one of the following: a manufacturer, a terminal model, a terminal type, a firmware version, a software version, and a hardware version;
the memory comprises at least one of the following: a currently available memory, and a total memory; and
the battery comprises at least one of the following: a current battery level, and a battery state;
wherein the management operation or capability of the terminal configuration service further comprises: acquiring a terminal capability; wherein
input information for said acquiring a terminal capacity comprises: a terminal identifier;
return information for said acquiring a terminal capability comprises at least one of the following: a response type, and a terminal capability list;
the terminal capability list comprises one or more terminal capabilities; and
the terminal capability comprises at least one of the following: an attachment flag, a capability action state, an enabling flag, and a disabling flag;
wherein the terminal management server uses at least one of the following technologies: an Extensible Messaging and Presence Protocol XMPP, a Message Queuing Telemetry Transport MQTT, an Open Mobile Alliance Device Management OMA DM, a Broadband Forum Client WAN Management Protocol BBF CWMP.

13. The apparatus according to claim 12, wherein the target terminal comprises one of the following: a single terminal, a plurality of terminals indicated by a list, and a group of terminals.

14. The apparatus according to claim 12, wherein the management operation or capability of the terminal configuration service is performed based on a scheduling arrangement.

15. A system for a terminal configuration service of the Internet of Things, comprising the apparatus according to claim 12 and a device, comprising a second processor which runs an application entity, arranged to request for the terminal configuration service.

16. The system according to claim 15, wherein the first processor is further arranged to adapt the management operation or capability of the terminal configuration service to a corresponding technical operation of a terminal management server.

* * * * *